United States Patent [19]
Mahnke et al.

[11] 4,190,547
[45] Feb. 26, 1980

[54] NON-FLAMMABLE INSULATING MATERIAL

[75] Inventors: Harald Mahnke; Jüergen Nieberle, both of Ludwigshafen; Volker Trautz, Neckarhausen; Heinz Weber, Gruenstadt, all of Fed. Rep. of Germany

[73] Assignee: BASF Aktiengesellschaft, Fed. Rep. of Germany

[21] Appl. No.: 909,193

[22] Filed: May 25, 1978

[51] Int. Cl.$^2$ .............................................. C04B 43/02
[52] U.S. Cl. .................................. 252/62; 106/288 B; 106/308 M; 428/375; 428/407; 428/451; 428/524; 428/921; 260/38; 106/15.05
[58] Field of Search ............... 252/62; 106/74, 308 M, 106/DIG. 1, DIG. 2, 15 FP, 288 B; 260/57 R; 428/375, 407, 451, 524, 538, 921

[56] References Cited
U.S. PATENT DOCUMENTS

| | | | |
|---|---|---|---|
| 2,633,433 | 3/1953 | Hollenberg | 252/62 X |
| 2,884,380 | 4/1959 | Cook et al. | 252/62 |
| 3,055,831 | 9/1962 | Barnett et al. | 252/62 |
| 3,408,316 | 10/1968 | Mueller et al. | 260/17.2 |
| 3,714,047 | 1/1973 | Marion et al. | 252/61 |
| 3,770,466 | 11/1973 | Wilton | 106/56 |

FOREIGN PATENT DOCUMENTS

| | | | |
|---|---|---|---|
| 2630834 | 3/1977 | Fed. Rep. of Germany | . |
| 1271352 | 7/1961 | France | 252/62 |
| 1204472 | 9/1970 | United Kingdom | 252/62 |
| 1273152 | 5/1972 | United Kingdom | 252/62 |
| 1406944 | 9/1975 | United Kingdom | . |

*Primary Examiner*—P. E. Willis, Jr.
*Attorney, Agent, or Firm*—Keil & Witherspoon

[57] ABSTRACT

Non-flammable insulating materials having good fire resistance and a density of from 80 to 230 g/l, which materials comprise A. from 99 to 80% by weight of inorganic lightweight particles, preferably expanded perlite or vermiculite,
B. from 0 to 20% by weight of fibrous or granular inorganic additives and
C. from 1 to 20% by weight of a heat-resistant organic high molecular weight binder, preferably a phenol-formaldehyde condensate, and which contain, as an additional binder C' to prevent water absorption, from 0.2 to 4% by weight of an alkylphenol/phenyl/formaldehyde condensate.

The materials may be used as heat insulating materials or building materials.

2 Claims, No Drawings

NON-FLAMMABLE INSULATING MATERIAL

The present invention relates to a non-flammable insulating material having good fire resistance and reduced water absorption, for use in building and heat insulation, which insulating material comprises inorganic lightweight particles which are bonded to one another by a heat-resistant polymeric organic binder.

German Laid-Open Applicaton DOS 2,630,834 relates to a non-flammable insulating material having good fire resistance and a density of from 80 to 230 g/l, which material comprises (A) from 99 to 80% by weight of inorganic lightweight particles having a mean particle diameter of from 0.05 to 3 mm and a bulk density of from 30 to 150 g/l and (B) from 0 to 40% by weight of fibrous or granular inorganic additives, the particles being bonded to one another by (c) from 1 to 20% by weight of a heat-resistant organic high molecular weight binder.

Such insulating materials absorb a relatively large amount of water, which is a substantial disadvantage for certain applications. It can lead to a deterioration in the heat insulating properties and also reduces the frost resistance. It is an object of the present invention to reduce the water absorption of insulating materials of the type described in German Laid-Open Applicaton DOS 2,630,834.

We have found that this object is achieved if the insulating material contains from 0.2 to 4, preferably from 0.5 to 2, % by weight, based on the mixture, of an alkylphenol phenol formaldehyde condensate as an additional binder C'. Such phenolic resins based on an alkylphenol have a hydrophobic effect on the insulating material.

The insulating materials of the invention are non-flammable when tested in accordance with DIN 4102; they have good fire resistance if used in a thickness of 5 cm, covered on either side with 3 mm of asbestos cement. They have a relatively low density of from 80 to 230 g/l, preferably from 120 to 180 g/l, and as a result have a very high heat insulating capacity.

The inorganic lightweight particles A employed have a mean particle diameter of from 0.05 to 3 mm, preferably from 0.2 to 2 mm. Their bulk density is from 30 to 150 g/l, preferably from 40 to 80 g/l. The use of silicate materials, e.g. water-insoluble alkali metal silicates having an $SiO_2:Me_2O$ ratio greater than 4.5:1, or silicates of the 2nd or 3rd main group of the periodic table, is preferred. Expanded perlite or vermiculite is particularly preferred; however, foam glass, fly ash or expanded gypsum are also suitable.

Perlite is a hydraulic aluminosilicate derived from rhyolite lava. It essentially contains from 70 to 85% of $SiO_2$, from 12 to 14% of $Al_2O_3$ and from 2 to 3% of water. Vermiculite is a hydraulic magnesium aluminosilicate of indeterminate structure, containing from 8 to 12% of MgO, from 60 to 65% of $SiO_2$ from 6 to 12 % of $Al_2O_3$ and from 1 to 40% of water.

The insulating materials may or may not contain up to 40% by weight of fibrous or granular inorganic additives B. Fibrous additives improve the modulus of elasticity of the building materials. The fibers should be from 2 mm to 3 cm long. Glass fibers, employed in amounts of from 2 to 10% by weight, and rock wool or mineral wool, employed in amounts of from 5 to 30% by weight, in each case based on the total mixture, are preferred. Granular additives improve the strength of the building materials. The particles should have a diameter of $<100$ $\mu$m, Talc or gypsum, employed in amounts of from 15 to 30% by weight, based on the total mixture, are preferred.

In the insulating materials according to the invention, the particles A and B are bonded to one another by from 1 to 20% by weight, preferably from 8 to 20% by weight, of a heat-resistant, inorganic, high molecular weight binder. The binders preferably have a maximum use temperature, measured by the method of DIN 53,446, of above 100° C., preferably above 150° C. Maximum use temperature is defined as the temperature at which the material in question can be kept for 25,000 hours in air without detectable change in its properties.

Advantageously, the insulating materials of the invention are manufactured using curable binder precondensates in the form of aqueous dispersions or solutions, which may or may not contain small, amounts of conventional dispersion stabilizers, crosslinking agents catalysts, flow modifiers or other additives.

The preferred binder intermediates used in the manufacture of the insulating materials are organic polycondensates or polyadducts which cure at an elevated temperature, in the presence or absence of crosslinking agents or crosslinking catalysts, by undergoing further condensation or crosslinking to give a high molecular weight binder which withstands high temperatures. Since 200° C. should only be exceeded briefly, if at all, when curing alkylphenol-based resins, particularly suitable binders are those which cure at low temperatures.

Examples of very suitable binders are polyester-imides, polyurethanes, polyesters, melamine/formaldehyde resins and especially phenol/formaldehyde resins.

Aqueous dispersions of polyester-imides are polycondensates of aromatic polycarboxylic acids, polyhydric alcohols and polyhydric amines. They contain, in general, from 0.5 to 7, preferably from 1 to 5, % by weight of imide nitrogen in the form of five-membered imide rings which are fused to aromatic nuclei. The following starting materials may be used for their manufacture:

10 equivalents of aromatic tricarboxylic or tetracarboxylic acids, their anhydrides or esters, e.g. trimellitic acid, pyromellitic acid or their anhydrides, with or without aromatic dicarboxylic acids or their esters, e.g. terephthalic acid, isophthalic acid or naphthalenedicarboxylic acid, and their lower alkyl esters;

from 5 to 20 equivalents of lower aliphatic diols, e.g. ethylene glycol, propylene glycol or butanediol, with or without trihydric or tetrahydric alcohols, e.g. glycerol, trimethylolpropane or trishydroxyethyl isocyanurate; and from 1 to 5 equivalents of di-primary or tri-primary amines, for example ethylenediamine, hexamethylenediamine, benzidine, diaminodiphenylmethane, diaminodiphenyl ketone, diaminodiphenyl ether or diaminodiphenyl sulfone, phenylenediamine, toluylenediamines, xylylenediamines or melamine.

It is possible either to condense the starting materials together, preferably in the presence of a solvent, or to employ precondensates, e.g. diimide-dicarboxylic acids obtained from 2 moles of trimellitic anhydride and 1 mole of a di-primary aromatic amine.

In the aqueous dispersions, the polyester-imides are present in the form of particles with average diameters of less than 50 $\mu$m, preferably less than 5 $\mu$m. They generally contain from 0.01 to 5, preferably from 0.1 to 3, % by weight of a dispersant, in particular a polymeric organic substance containing polar groups, e.g. polyvinyl alcohol, a cellulose ether, polyvinylpyrrolidine, polyacrylic acid, a partially hydrolyzed acrylic ester/acrylonitrile copolymer or, preferably, a copolymer of vinylpyrrolidone and vinyl propionate. They also contain crosslinking catalysts in amounts of from 0.5 to 5% by weight, e.g. oxotitanates, triethanolamine titanate, titanium lactate or titanium oxalate. In addition, they may contain flow modifiers, thickeners, anti-thixotropic agents and neutralizing agents. On curing, further condensation and crosslinking of the polyesterimides occurs.

Further suitable binders are polyurethanes. Polyurethanes are polyadducts of polyisocyanates and hydroxyl-containing polyesters or polyethers. Preferred polyurethane-forming starting materials are mixtures of from 70 to 10% by weight of a polyester or polyether having a hydroxyl number greater than 20 and from 30 to 90% by weight of a blocked polyisocyanate. Aromatic polyisocyanates blocked with a phenol or a lactam are particularly suitable. The dispersed particles have a diameter of from 0.05 to 2 μm; the dispersion once again preferably contains a dispersant. On curing, the blocking agent is eliminated and the polyisocyanate liberated can undergo crosslinking with the hydroxyl of the polyester or polyether, to form polyurethane bonds.

Crosslinked polyesters, preferably those based on aromatic dicarboxylic acids, are also suitable binders. In this case, an aqueous dispersion or solution may be prepared, which contains the non-crosslinked or only slightly crosslinked polyester together with a polyol as a crosslinking agent. On curing, further condensation, accompanied by crosslinking, takes place.

Crosslinked melamine/formaldehyde and phenol/formaldehyde resins are also suitable binders. In this case, procondensates of melamine, phenol or cresol with formaldehyde, having molecular weights of from about 400 to 800, are used. The use of an aqueous solution of a phenol/formaldehyde condensate is particularly advantageous.

The binders C' to be added in accordance with the invention and condensates of an alkylphenol, phenol and formaldehyde. They are manufactured by base-catalyzed condensation of alkylphenol, phenol and formaldehyde, in aqueous solution in the presence of an emulsifier and of a protective colloid. An example of a suitable method of preparation is described in German Laid-Open Application DOS 2,330,815. The use of alkylphenols where alkyl is of 2 to 12 carbon atoms is preferred; octylphenol and nonylphenol are particularly suitable. The molar ratio of phenol to alkylphenol may vary within wide limits, namely from 5:1 to 1:5, preferably from 2:1 to 1:2; the molar ratio of formaldehyde to the sum of phenol + alkylphenol may be higher than in German Laid-Open Application DOS 2,330,815 and is preferably from 2.3:1 to 1.6:1.

A preferred process for the manufacture of the insulating materials according to the invention comprises the following steps:

(a) the lightweight particles and additives, and an aqueous dispersion or solution, of from 1 to 50 percent strength by weight, of the curable binder intermediate are mixed;

(b) if necessary, the water is substantially removed by mechanical means;

(c) the moist mixture is pressed to form sheets which are from 1 to 25 cm, preferably from 2 to 8 cm thick and (d) finally the material is cured, preferably in the presence of a catalyst, e.g. p-toluenesulfonic acid, at from 80° to 200° C., especially from 100° to 160° C.

The method of manufacture varies somewhat depending on whether fibrous additives are or are not contained in the materials.

In the case of insulating materials which do not contain any fibers, the lightweight particles are sprayed with an aqueous dispersion or solution of the binder intermediate, of from about 1 to 50, preferably 2 to 10, percent strength by weight, the particles being agitated in conventional mixing equipment. It is a particular advantage of the use of an aqueous binder system that a particularly fine and uniform distribution of lightweight particles and binder is achieved. Thereafter, some of the water may or may not be removed by mechanical means. The material is then pressed in the moist state, in conventional presses under pressures of from about 1 to 10 kp/cm², to form sheets. These are then heated further, whereupon further condensation and crosslinking to form the heat-resistant organic high molecular weight binder takes place.

In the case of insulating materials which contain fibers, the fibers are first slurried by stirring with water which contains surfactants as conventional dispersants. The binder dispersion or solution and the lightweight particles are then added and the batch is mixed vigorously. The greater part of the water is then removed on a sheet-forming machine as conventionally used in the paper industry. After slight pressing, the sheet is dried and, where appropriate, crosslinking is effected.

The insulating materials of the invention can be converted to sandwich elements by gluing the conventional outer layers, e.g. asbestos cement, gypsum board or sheet metal, onto them. They may be used for the construction of non-loadbearing walls, ceilings and floors; however, they can also be employed for the cladding of load-bearing walls, ceilings and floors or, in warehouses or cold stores, as a heat-insulating fire barrier layer.

EXAMPLE (a) Preparation of the Binder C'

1,035 Parts of a 13% strength aqueous solution of polyvinyl alcohol are homogenized by stirring with 400 parts of water, 288 parts of an ethoxylated octylphenol and 200 parts of 25% strength ammonia. 846 parts of phenol, 1,854 parts of octylphenol (molar ratio of formaldehyde to total phenol = 2.1) and 2,700 parts of a 40% strength aqueous solution of formaldehyde are then added and the batch is refluxed for about 4 hours, with vigorous stirring. It is then cooled to room temperature whilst stirring is continued. A homogeneous, stable dispersion having a solids content (after drying for 2 hours at 120° C.) of 50%, a viscosity of 600 mPas at 20° C. and a pH of 8.0 is obtained.

(b) Preparation of the Insulating Material

89 Parts of a 60% strength aqueous phenolic resin solution (molar ratio of phenol to formaldehyde = 1:1.6), 3 parts of p-toluenesulfonic acid and 8 parts of the 50% strength aqueous dispersion (a) are mixed homogeneously. Expanded perlite having a mean particle diameter of 0.7 mm and a bulk density of 50 g/l is compounded with this binder in a mixer to give a mixture which, based on solids, contains 13.3% of the phenolic resin and 1% of the phenol/alkylphenol/formaldehyde condensate. The resin-treated material is compressed in a conventional press under a pressure of from about b 2.5 to 3.0 kp/cm² to give a pressing having a density of 200 g/l, which is then heated at about 150° C., whereupon the binder cures.

A 50 mm thick sheet has a water absorption of 5% by volume in the hour 24 immersion test according to DIN 53,428.

By way of comparison, a sheet of the same density which does not contain the hydrophobic binder C' has a water absorption of 33% by volume.

We claim:

1. Non-flammable insulating material having good fire resistance and a density of from 80 to 230 g/l, which material comprises (A) from 99 to 80% by weight of expanded perlite or vermiculite having a mean particle diameter of from 0.05 to 3 mm and a bulk density of from 30 to 150 g/l and
    (B) from 0 to 40% by weight of inorganic additives, selected from the group consisting of glass fibers, rockwool, mineral wool, talc and gypsum, the particles being bonded to one another by
    (C) from 1 to 20% by weight of a heat-resistant organic high molecular weight binder, selected from the group consisting of crosslinked melamine/formaldehyde and phenol/formaldehyde resins,
    wherein the insulating material contains, as an additional binder 0.2 to 4% by weight, based on the mixture, of an alkylphenol/phenol/formaldehyde condensate C'.

2. A non-flammable insulating material as claimed in claim 1, wherein, in the alkylphenol of binder C', alkyl is of 2 to 12 carbon atoms.

* * * * *

UNITED STATES PATENT AND TRADEMARK OFFICE
CERTIFICATE OF CORRECTION

PATENT NO. : 4,190,547

DATED : February 26, 1980

INVENTOR(S) : Harald Mahnke; Juergen Nieberle, Volker Trautz & Heinz Weber

It is certified that error appears in the above-identified patent and that said Letters Patent are hereby corrected as shown below:

On the cover page, after line 11 insert the following:

--[30] Foreign Application Priority Data

June 10, 1977 [DE] Fed.Rep. of Germany ..... 2726105--

Signed and Sealed this

Second Day of September 1980

[SEAL]

Attest:

SIDNEY A. DIAMOND

Attesting Officer    Commissioner of Patents and Trademarks